United States Patent [19]
Walters

[11] 3,718,083
[45] Feb. 27, 1973

[54] POULTRY PROCESSING APPARATUS
[75] Inventor: Roger E. Walters, Glendale, Mo.
[73] Assignee: Ralston Purina Company, St. Louis, Mo.
[22] Filed: May 24, 1971
[21] Appl. No.: 146,066

[52] U.S. Cl. .................................... 99/532, 99/346
[51] Int. Cl. ........................................ A23b 1/16
[58] Field of Search .....99/257, 256; 27/24; 128/216, 128/233, 333, 339; 239/333

[56] References Cited

UNITED STATES PATENTS

| | | | |
|---|---|---|---|
| 1,321,550 | 11/1919 | Platt et al. | 128/216 |
| 2,116,591 | 5/1938 | Barber | 99/257 X |
| 2,435,647 | 2/1948 | Engseth | 99/257 UX |
| 2,626,185 | 1/1953 | Roselund | 239/333 X |
| 3,080,809 | 3/1963 | Harris et al. | 99/257 |
| 3,104,448 | 9/1963 | Morrow et al. | 27/24 R |
| 3,232,209 | 2/1966 | Earl et al. | 99/257 |
| 3,344,731 | 10/1967 | Trees | 99/257 |
| 3,511,164 | 5/1970 | Strandine et al. | 99/257 |

FOREIGN PATENTS OR APPLICATIONS

| | | | |
|---|---|---|---|
| 148,603 | 10/1952 | Australia | 99/257 |
| 788,418 | 7/1935 | France | 99/256 |
| 804,904 | 8/1936 | France | 99/257 |

*Primary Examiner*—Robert W. Jenkins
*Assistant Examiner*—Arthur O. Henderson
*Attorney*—R. W. Brukardt and L. J. Hurst

[57] ABSTRACT

Apparatus is shown for injecting a material into a poultry product whereby the injection needles may be provided at a location remote from the pump and shut-off valve controlling the flow of material to the injecting apparatus. The injection apparatus consists of a needle assembly having the needles provided at a predetermined angle to the handle on the needle assembly such that when the operator holds the injection apparatus in the normal position, the needles are positioned to prevent the injection material from leaking or dripping therefrom. Further, since there is substantially no leakage of injection material from the needles, it is possible to inject birds with a desired quantity of fluid within very low tolerances.

6 Claims, 3 Drawing Figures

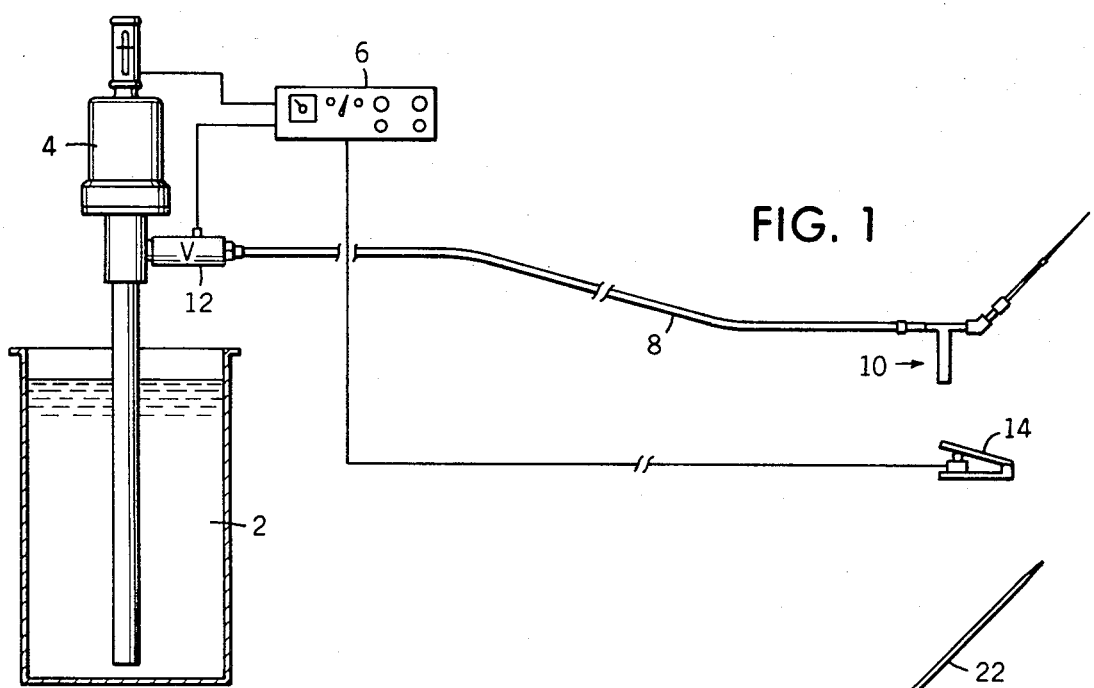
FIG. 1
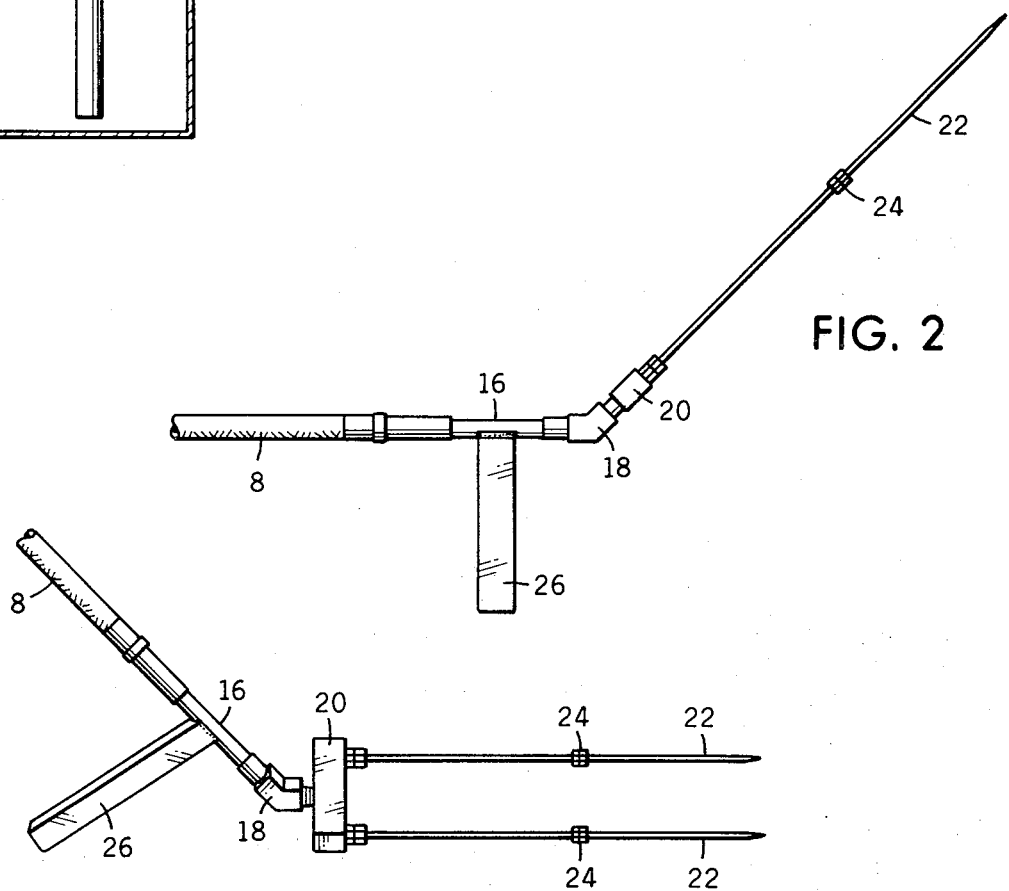
FIG. 2
FIG. 3
INVENTOR
ROGER E. WALTERS
BY
Lawrence J. Hurst
ATTORNEY

POULTRY PROCESSING APPARATUS

BACKGROUND OF THE INVENTION

The use of injection equipment for supplying a basting or flavoring material to poultry products is well known. However, these types of basting equipment have generally been of two classes. The first class utilized a control or metering valve physically connected to the injection needles for controlling the supply of material to the needles. While this arrangement was somewhat satisfactory in substantially preventing the leakage of materials from the needles, the physical arrangement was somewhat cumbersome and difficult to work with. When only a one-way check valve was employed at the nozzle, difficulty was experienced in manipulating the injection needles and leakage of the material from needles was still experienced. Further, difficulty was encountered with a one-way check valve in that the desired degree of metering of basting material to the needle could not be accomplished since the valve operation did not permit rapid enough cut-off of the injection or basting material.

The second class of apparatus utilized consisted of a fixed manifold having a plurality of needles thereon and required moving the poultry to the needles rather than moving the injection equipment to the poultry. This was necessitated by the controls attached to the needles to keep the material supplied to the needles from leaking or dripping therefrom.

Thus, each of these classes of apparatus had the undesirable or disadvantageous feature of not permitting the injection needles to be utilized at a location remote from the injection pump and control or metering valve and still attain the desired control of the quantity of material being injected. Further, these remote location injection needles had the undesirable characteristic of permitting leakage or dripping of the injection or basting material from the needles following injection so that extreme difficulty was encountered in insuring that the desired quantity of material would be injected.

SUMMARY OF THE INVENTION

An improved apparatus for injecting a material into a poultry product is disclosed which comprises a needle assembly remote from the injection pump and control valve having a rigid supply line portion connected to a manifold containing at least one injection needle, a hand hold member connected to the rigid supply line for the operator to hold the needle assembly, and the injection needles being positioned at a predetermined angle to the hand hold member, so that when the operator's hand is in its normal position the injection needles are inclined to prevent the injection material from leaking or dripping from the needle assembly.

It is, therefore, the principal object of the present invention to provide a needle assembly for injecting a basting or flavoring material into a poultry product which may be located at a position which is remote from the pump and control valve supplying the basting material to the needle assembly.

Another object of the present invention is to provide a needle assembly arrangement which substantially prevents the dripping or leakage of injection material from the needle following injection.

Still another object of the present invention is to provide injection apparatus which is substantially free of dripping or leakage which permits greater control and accuracy of the quantity of material being injected.

These and other objects and advantages of the present invention will become more apparent from the description which follows hereafter.

BRIEF DESCRIPTION OF THE DRAWINGS

FIG. 1 is a schematic drawing of the injection apparatus embodying the present invention;

FIG. 2 is a side view of the needle assembly of the present invention when in an at rest position; and FIG. 3. is an elevation view of the needle assembly of the present invention when positioned for injecting the poultry.

DESCRIPTION OF THE PREFERRED EMBODIMENTS

The present invention is concerned with an improved injection apparatus and more particularly with providing a needle assembly which may be located at a position remote from the control valve and pump. The preferred use of the improved apparatus is for injecting a material into a poultry product. In addition, the invention is concerned with preventing leakage or loss of the injection material from the needles so that the injection quantities may be uniformly regulated. The material to be injected may be selected from any of the group of materials, which are essentially aqueous materials, normally injected into poultry products, such as a basting material or a flavoring material.

Referring now to FIG. 1, a tank 2 is utilized for holding the aqueous material to be injected. If desired, a cooling coil may be provided about the tank 2 for maintaining the injection material in a cooled condition as it is held prior to injection. A sanitary pump 4 is provided within the tank for supplying the aqueous basting or flavoring material to the needle assembly. The pump 4 is a standard pump which may be adjusted to supply a predetermined volume of injection material per stroke of the pump. Such pumps are commercially available from suppliers such as Graco Pump Company and are well known to the art. A control panel 6 is utilized for controlling the number of cycles of the pump 4. A hose 8 connects the pump 4 with the needle assembly, indicated generally at 10. The hose 8 should be flexible to allow for operator manipulation, however, the hose should be of a material and thickness which has a very low coefficient of expansion. The significance of using a hose having a low coefficient of expansion will become clear in the description hereinafter. A control or shut-off valve 12 is provided in the hose 8 between the pump 4 and the needle assembly 10 for serving as a fast acting high pressure cut-off to interrupt the flow of material from the pump to the needle assembly. The shut-off valve 12 is controlled by the control panel 6 so that said valve is opened and closed substantially simultaneously with the operation of the pump 4. To complete the description of the injection apparatus, it should be noted, that a foot switch 14 is connected to the control panel 6 such that activation of the foot switch serves to activate the pump 4 and open the shut-off valve 12 permitting the material to be supplied from the tank 2 through the pump 4 control valve 12 and conduit 8 to the needle assembly 10 which may be located at a position remote from the pump and control valve. Additionally, it should be noted that the activation of the foot switch 14 starts the stroke counter for the pump 4 so that only a predetermined number of strokes of the pump 4 will be made. Upon completion of the desired number of strokes of the pump 4, the pump is deactivated and the shut off valve 12 closed to interrupt the flow of material from tank 2 to needle assembly 12.

Referring now to FIGS. 2 and 3, the needle assembly indicated generally at 10 is shown in greater detail. Particularly, the needle assembly 10 consists of a rigid supply line portion 16 which has one end thereof provided for connection to the flexible conduit 8, and the other end thereof is provided for receipt within an angled conduit member 18, such as an ell. This angled conduit member 18 is preferably provided with an angle of about 30° to 60° and more particularly, is at a 45° angle to the rigid supply line 16. The angled conduit 18 is connected to a manifold member 20 which is adapted to receive at least one hollow injection needle 22. For convenience, the needle assembly 10 is shown as having two needles in the preferred embodiment. The needles 22 may be received within the manifold 20 by suitable means, such as being threadedly received and are sized to suit the operator's preference depending on the type of poultry product to be injected. If desired, set-screw collars 24 may be provided on the needles 22 for controlling the depth of penetration of the needles within the poultry product to be injected. In addition, a hand hold member 26 is provided on the rigid supply line 16 at a 90° angle thereto, by suitable means such as a sanitary weld. It should be noted that the relationship between the hand hold member 26 and the angle of the needles 22 thereto is such that when the operator holds the needle assembly 10 in a normal or at rest position (as in FIG. 2) the needles 22 are inclined to prevent the injection material from leaking therefrom. Further, this angle between the hand hold member 26 and needles 22 is such that when the needles are in a horizontal position for injection the operator will still be able to obtain sufficient leverage for effecting the ready insertion and removal of the needles 22 from the poultry product being injected. It should also be realized that it is not necessary that the needles be provided at an angle to the rigid supply line portion but rather that the critical angle of 30° to 60° and preferably 45° be defined between the needles 22 and the hand hold member 26. As is obvious, this could be effected by providing the hand hold member at an angle to the supply line portion 16 rather than in the position shown in FIGS. 2 and 3.

In order to obtain the desired no leakage character of the subject needle assembly and to permit its location at a point remote from the control or shut-off valve 12, it is important that the flexible hose have a low coefficient of expansion. This is important because during the injection of material into a poultry product, there will be a back pressure or resistance from the poultry to the fluid being injected. Thus, following injection when the needles would be removed from the poultry product, the return of the hose to normal position if a large coefficient of expansion existed would serve to force the basting or injection material from the hose and needles. Additionally, the size openings in the needles 22 should be selected to permit the surface tension of the fluid within the needles from leaking out when the needles are removed from injection. Typically when injecting a substantially aqueous material and using a pump pressure of about 300 — 400 psi, satisfactory results have been obtained with needles having an internal diameter of approximately one-eighth inch and having three openings of about 0.05 inches in diameter when using a hose having a very low coefficient of expansion. Of course, other combinations could be utilized to substantially prevent leakage from occuring through the needles if the hose has a sufficiently low coefficient of expansion to retard residual pressure build up and the needle openings are sufficiently small for the surface tension of the injection material to prevent leakage from occuring therefrom.

In the operation of the subject invention the needle assembly will be positioned substantially as shown in FIG. 2; with the needles 22 in an elevated position to substantially prevent the leakage or dripping of the injection material therefrom. When the poultry product is presented for injection, the operator manipulates the needle assembly substantially to the position shown in FIG. 3 with the needles in a substantially horizontal position and the needles are inserted into the poultry product to be injected. The operator then activates the foot switch 14 which causes the control panel 6 to activate the pump 4 and open the shut-off valve 12 which serves to supply the injection material from the tank 2 to the needle assembly 10 as previously discussed. The pump 4 is operated for the desired number of strokes as set on the control panel 6, to supply the desired quantity of injection material to the needle assembly 10 and thereafter the pump 4 is deactivated and the shut-off valve 12 closed. Since the material being injected is injected against a back pressure, the completion of the pumping cycle and closure of the control valve 12 serves to trap the injection material within the needle assembly 10 and flexible conduit 8 to the control valve 12. Thereafter, when the operator removes the needle assembly to the normal or at rest position, the elevation of the needles 22 serves to prevent any leakage or dripping of the injecting material from the needles 22. Additionally, since the hose is selected to prevent residual pressure being generated by the expansion thereof and since the needle openings are sized to permit the surface tension or capillary action of the injection material to prevent leakage therefrom, there is substantially no loss or leakage of injection material from the injection apparatus. Thus, each injection cycle of the subject apparatus serves to supply substantially the same quantity of material as did the previous injection cycle.

In view of the foregoing, it is readily apparent that a novel needle assembly and injection apparatus has been disclosed which permits the utilization of the needle assembly at a point remote from the supply pump and control valve without the usual problem of leakage, and which permits substantially uniform quantities of injection material to be supplied from the apparatus, and that other modifications and changes may be made in the specific apparatus without departing from the spirit of the invention defined by the claims which follow.

We claim:

1. Apparatus for injecting a basting material into the flesh of poultry substantially without leakage of the basting material comprising: a pump connected to a source of basting material, a control valve connected to said pump for controlling the flow of basting material to be injected, a needle assembly for injecting the basting material into the poultry product, a flexible hose connecting said control valve into said needle assembly, said hose having a sufficiently low coefficient of expansion to substantially prevent the build-up of residual pressure in the hose, said needle assembly including a handle member and at least one injection needle having injection openings therein, said handle member being at a predetermined angle of about 30° – 60° to said needle such that when the operator holds the needle assembly with the needle in a horizontal position sufficient leverage for effecting the ready insertion and removal of the needle from the poultry product being injected is obtained from said handle member and when the operator holds the needle assembly in an at-rest position the needle is inclined, the injection openings in said needle being sufficiently small that the surface tension of the material within the needle in combination with the prevention of build-up of residual pressure in the hose substantially prevents the basting material from leaking from the injection openings when the needle is inclined.

2. The apparatus according to claim 1 wherein the angle is 45°.

3. The apparatus according to claim 1 wherein the needle assembly has two needles.

4. Apparatus for injecting a material into a poultry product substantially without leakage of the material wherein the needle assembly is located at a position remote from the pump and control valve assembly which supplies the injection material from a source to the needle assembly comprising: a flexible hose connecting the pump and control valve to the needle assembly, said hose having a sufficiently low coefficient of expansion to substantially prevent the build-up of pressure in the hose, said needle assembly consisting of a manifold member, at least one hollow needle connected to said manifold, said needle having injection openings therein, and a handle member connected to said manifold at a predetermined angle to said needles such that when the operator holds the needle assembly in an at-rest position the needles are inclined to the hose connected thereto and the injection openings in said needle being sufficiently small that the surface tension of the material within the needle in combination with the prevention of build-up of residual pressure in the hose substantially prevents the basting material from leaking from the injection openings when the needle is inclined.

5. The apparatus according to claim 4 wherein said handle member comprises a rigid supply line portion connected to said hose and to said manifold at the predetermined angle and a hand hold member connected to said supply line portion at substantially a right angle thereto such that when the operator holds the injecting apparatus in the at-rest position the needle is inclined to the supply line portion.

6. The apparatus according to claim 5 wherein two needles are provided on the manifold and the needles are provided at an angle of about 30°–60° from said handle member.

* * * * *